United States Patent
Liu et al.

(10) Patent No.: US 10,301,988 B2
(45) Date of Patent: May 28, 2019

(54) COMPONENT PERFORMANCE RECOVERY VIA INLET AND OUTLET SWAP

(71) Applicant: Cummins Emission Solutions, Inc., Columbus, IN (US)

(72) Inventors: Qiang Liu, Columbus, IN (US); Ying Yuan, Columbus, IN (US); Zheng Liu, Greenwood, IN (US); Arvind V. Harinath, Columbus, IN (US)

(73) Assignee: Cummins Emission Solutions, Inc., Columbus, IN (US)

( * ) Notice: Subject to any disclaimer, the term of this patent is extended or adjusted under 35 U.S.C. 154(b) by 292 days.

(21) Appl. No.: 15/136,034

(22) Filed: Apr. 22, 2016

(65) Prior Publication Data

US 2016/0312675 A1 Oct. 27, 2016

Related U.S. Application Data

(60) Provisional application No. 62/151,777, filed on Apr. 23, 2015.

(51) Int. Cl.
*F01N 3/023* (2006.01)
*F01N 3/08* (2006.01)
(Continued)

(52) U.S. Cl.
CPC ......... *F01N 3/0237* (2013.01); *F01N 3/0885* (2013.01); *F01N 3/10* (2013.01); *F01N 3/101* (2013.01); *F01N 3/2066* (2013.01); *F01N 11/00* (2013.01); *F01N 2260/04* (2013.01); *F01N 2450/30* (2013.01); *F01N 2550/02* (2013.01); *F01N 2550/03* (2013.01);
(Continued)

(58) Field of Classification Search
CPC .......... F01N 3/10; F01N 3/101; F01N 3/2066; F01N 3/0237; F01N 3/0885; F01N 11/00; F01N 2260/04; F01N 2450/30; F01N 2550/02; F01N 2550/03; F01N 2550/04; Y02T 10/22; Y02T 10/24; Y02T 10/47
USPC ........................................... 60/295, 297, 311
See application file for complete search history.

(56) References Cited

U.S. PATENT DOCUMENTS

| 4,417,908 A * | 11/1983 | Pitcher, Jr. | B01D 46/0001 210/510.1 |
| 7,716,922 B2 * | 5/2010 | Ehlers | F01N 3/023 134/1 |

(Continued)

*Primary Examiner* — Thai Ba Trieu
*Assistant Examiner* — Diem T Tran
(74) *Attorney, Agent, or Firm* — Foley & Lardner LLP

(57) ABSTRACT

A process for recovering performance of a component of an aftertreatment system. The component includes an inlet and an outlet. The inlet is positioned upstream relative to an exhaust gas flow through the aftertreatment system, and the outlet is positioned downstream relative to the exhaust gas flow through the aftertreatment system. The process includes removing the component from the aftertreatment system. The process also includes regenerating the component, such as subjecting the component to an acid wash and/or heat treating the component. The process further includes reinstalling the component into the aftertreatment system with the inlet positioned downstream relative to the exhaust gas flow through the aftertreatment system and the outlet positioned upstream relative to the exhaust gas flow through the aftertreatment system.

19 Claims, 4 Drawing Sheets

(51) Int. Cl.
*F01N 3/10* (2006.01)
*F01N 3/20* (2006.01)
*F01N 11/00* (2006.01)

(52) U.S. Cl.
CPC ........... *F01N 2550/04* (2013.01); *Y02T 10/22* (2013.01); *Y02T 10/24* (2013.01); *Y02T 10/47* (2013.01)

(56) References Cited

U.S. PATENT DOCUMENTS

| | | | | |
|---|---|---|---|---|
| 8,822,364 B2* | 9/2014 | Chen | ...................... | B01D 53/96 502/516 |
| 2007/0256410 A1* | 11/2007 | Cook | ...................... | F01N 3/023 60/295 |
| 2007/0289293 A1* | 12/2007 | Kerchner | ................ | F01N 3/023 60/295 |
| 2010/0126127 A1* | 5/2010 | Franken | ............. | F01N 13/1805 55/493 |

\* cited by examiner

COMPONENT PERFORMANCE RECOVERY VIA INLET AND OUTLET SWAP

CROSS-REFERENCE TO RELATED APPLICATIONS

The present application claims priority to U.S. Provisional Patent Application No. 62/151,777, filed Apr. 23, 2015 and the contents of which are incorporated herein by reference.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system. In some instances, performance of components of an aftertreatment system can be recovered through a remanufacturing process, such as by heat treatment, reapplying catalyst material, acid washing a catalyst, or clearing particulate matter from a filter. The recovered component could be resold as a remanufactured component or replaced into the original aftertreatment system.

SUMMARY

Implementations described herein relate to methods to recover component performance by swapping the inlet and outlet of the component via reversing the component's flow orientation in an aftertreatment system.

One implementation relates to a process for performance recovery for a component of an aftertreatment system. The component has an inlet and an outlet. The inlet is positioned upstream relative to an exhaust gas flow through the aftertreatment system, the outlet is positioned downstream relative to the exhaust gas flow through the aftertreatment system. The process includes removing the component from the aftertreatment system. The process also includes regenerating the component. The process further includes reinstalling the component into the aftertreatment system with the inlet positioned downstream relative to the exhaust gas flow through the aftertreatment system and the outlet positioned upstream relative to the exhaust gas flow through the aftertreatment system.

In some implementations, removing the component from the aftertreatment system is performed responsive to interpreting a parameter indicating the component is below a predetermined operational level. The predetermined operational level may be one of a percentage or value of hydrocarbon (HC) storage, a percentage or value of $NO_x$ storage, a percentage or value of ammonia storage, a percentage or value of oxygen storage, a percentage or value of HC oxidation, a percentage or value of NOx oxidation, a percentage or value of contamination, a percentage or value of thermal sintering, or a predetermine filter capacity. The interpreted parameter may be indicative of one of a $NO_x$ concentration amount, a hydrocarbon concentration amount, a feed-forward calculation of a condition of the component, an engine run time, or a predetermined period of calendar time. In some implementations, regenerating the component includes one or more of subjecting the component to an acid wash, heat treating the component, applying additional catalyst material to a portion of the component, applying a catalyst material to a rear face of the outlet of the component, applying a catalyst material to a front face of inlet of the component and material including one or more of a rare earth metal or precious group metal. In some implementations, the component includes a catalyst material including one or more of ruthenium, rhodium, palladium, osmium, iridium, or platinum. In some implementations, the component is a diesel oxidation catalyst. In some implementations, the component is one of a diesel particulate filter, a selective catalytic reduction catalyst, an ammonia slip catalyst, an SCR-on-filter, or a three-way catalyst.

Another implementation relates to a process for performance recovery for a component of an aftertreatment system. The component has an inlet and an outlet. The inlet is positioned upstream relative to an exhaust gas flow through the aftertreatment system, the outlet is positioned downstream relative to the exhaust gas flow through the aftertreatment system. The process includes interpreting a parameter indicative of an operational level of the component and comparing the parameter indicative of the operational level of the component to a predetermined operational level. The process includes removing the component from the aftertreatment system responsive to the parameter indicative of the operational level of the component exceeding the predetermined operational level. The process also includes regenerating the component by one or more of subjecting the component to an acid wash, heat treating the component, applying additional catalyst material to a portion of the component, applying a catalyst material to a rear face of the outlet of the component, applying a catalyst material to a front face of inlet of the component, or removing ash from the component. The process further includes reinstalling the component into the aftertreatment system with the inlet positioned downstream relative to the exhaust gas flow through the aftertreatment system and the outlet positioned upstream relative to the exhaust gas flow through the aftertreatment system.

In some implementations, removing the component from the aftertreatment system includes removing the component from within a casing. The casing may include an outer shell and a mat surrounding an outer portion of the component. In some implementations, the predetermined operational level is one of a percentage or value of hydrocarbon (HC) storage, a percentage or value of $NO_x$ storage, a percentage or value of ammonia storage, a percentage or value of oxygen storage, a percentage or value of HC oxidation, a percentage or value of NOx oxidation, a percentage or value of contamination, a percentage or value of thermal sintering, or a predetermine filter capacity. In some implementations, the interpreted parameter is indicative of one of a $NO_x$ concentration amount, a hydrocarbon concentration amount, a feed-forward calculation of a condition of the component, an engine run time, or a predetermined period of calendar time.

In some implementations, the component includes a catalyst material including one or more of a rare earth metal or precious group metal. In some implementations, the component includes a catalyst material including one or more of ruthenium, rhodium, palladium, osmium, iridium, or platinum. In some implementations, the component is a diesel oxidation catalyst. In some implementations, the component is one of a diesel particulate filter, a selective catalytic reduction catalyst, an ammonia slip catalyst, an SCR-on-filter, or a three-way catalyst.

A further implementation relates to a process for performance recovery for a component of an aftertreatment system. The component has an inlet and an outlet. The inlet is positioned upstream relative to an exhaust gas flow through the aftertreatment system, the outlet is positioned downstream relative to the exhaust gas flow through the aftertreatment system. The process includes interpreting a parameter indicative of an operational level of the component and comparing the parameter indicative of the operational level of the component to a predetermined operational level. The process includes removing the component from the aftertreatment system responsive to the parameter indicative of the operational level of the component exceeding the predetermined operational level. Removing the component from the aftertreatment system includes removing the component from within an outer shell and a mat surrounding an outer portion of the component. The process also includes regenerating the component by one or more of subjecting the component to an acid wash, heat treating the component, applying additional catalyst material to a portion of the component, applying a catalyst material to a rear face of the outlet of the component, applying a catalyst material to a front face of inlet of the component, or removing ash from the component. The process further includes reinstalling the component into the aftertreatment system with the inlet positioned downstream relative to the exhaust gas flow through the aftertreatment system and the outlet positioned upstream relative to the exhaust gas flow through the aftertreatment system. Reinstalling the component into the aftertreatment system includes positioning a new mat around the outer portion of the component and encasing the component and new mat within the outer shell.

In some implementations, the predetermined operational level is one of a percentage or value of hydrocarbon (HC) storage, a percentage or value of $NO_x$ storage, a percentage or value of ammonia storage, a percentage or value of oxygen storage, a percentage or value of HC oxidation, a percentage or value of NOx oxidation, a percentage or value of contamination, a percentage or value of thermal sintering, or a predetermine filter capacity.

BRIEF DESCRIPTION

The details of one or more implementations are set forth in the accompanying drawings and the description below. Other features, aspects, and advantages of the disclosure will become apparent from the description, the drawings, and the claims, in which:

Figure 5:
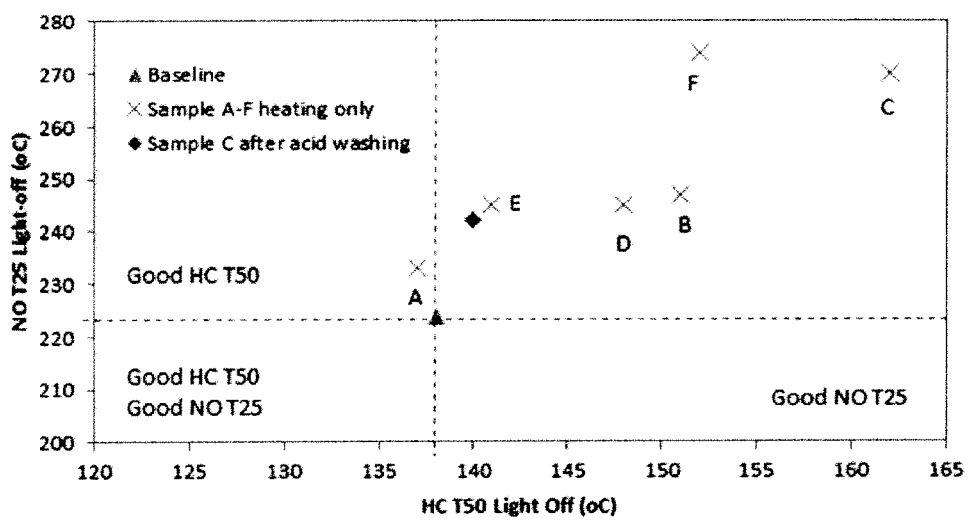
Figure 6:
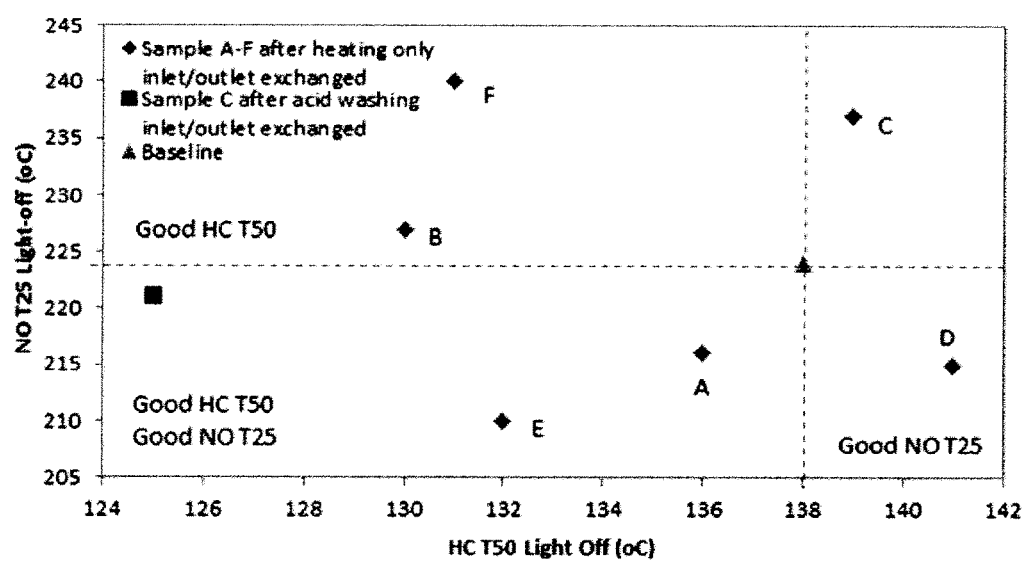

FIG. 5 is a graphical diagram of HC light-off and $NO_x$ oxidation performance of DOC catalyst samples when subjected to heat treatment and/or acid washing without switching the inlet and outlet ends; and FIG. 6 is a graphical diagram of HC light-off and $NO_x$ oxidation performance of DOC catalyst samples when subjected to heat treatment and/or acid washing after switching the inlet and outlet ends.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for recovering component performance by swapping the inlet and outlet of the component. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In a component of an aftertreatment system, such as a catalyst of an aftertreatment system, the presence of hydrocarbons in exhaust gas emissions may reduce and/or substantially inhibit $NO_x$ oxidation by catalyst materials. Accordingly, an upstream portion of the catalyst may be configured to treat a first portion of exhaust gas emissions, such as HCs, while a downstream portion is configured to treat a second portion of the exhaust gas emissions, such as $NO_x$. In other components of the aftertreatment system, such as diesel particulate filters, the presence of ash or other blockage material may reduce the effectiveness of the component.

As the aftertreatment system is used to treat exhaust gas emissions, the performance of the component of such a system may degrade in performance over time. Such degradation of performance may result from chemical contamination of the catalyst materials, such as sulfur, phosphorous, or other contaminants that coat the catalyst material, buildup of materials in the component, such as ash buildup or loading in a diesel particulate filter, etc. Pores formed between layers of catalyst materials and/or other component materials may be blocked by contaminants as well. Still further, downstream portions of the catalyst material may thermally sinter together (i.e., compacting the catalyst material) due to the heat of the system. Thus, as a catalyst is exposed to exhaust gas emissions over a period of time, the upstream portion of the catalyst material may degrade in HC light-off performance due to the contaminants while the downstream portion may degrade in $NO_x$ oxidation performance due to the thermal sintering of the catalyst material.

Some methods for recovering HC light-off performance of a catalyst include acid washing the catalyst to remove the chemicals contaminating the catalyst material (e.g., a citric acid wash, an oxalic acid wash, etc.) and/or heat treating the catalyst. For example, acid washing is effective for removal of sulfur and/or phosphorous contaminants from the catalyst material while heat treating is effective for removing HC masking, $Al_2(SO_4)_3$ contaminations, etc.

While the acid washing and/or heat treatment of the catalyst material may improve performance via removing the chemical contaminants, the downstream portion of the catalyst material may still have degraded $NO_x$ oxidation performance due to the thermal sintering. However, HC light-off performance may be less sensitive to thermal sintering of the catalyst material than the $NO_x$ oxidation performance. Thus, the downstream thermally sintered catalyst material may be useful to be repositioned upstream as the HC light-off performance is less sensitive to the thermally sintered catalyst material while the non-thermally sintered and/or lesser thermally sintered catalyst material repositioned downstream to improve the downstream $NO_x$ oxidation performance. In some implementations, the swapping of the upstream and downstream catalyst material may be done via reversing the inlet and outlet of the catalyst relative to the exhaust gas flow (i.e., flipping the catalyst such that the original inlet is at the outlet side and the original outlet is at the inlet side). In some implementations, the original outlet face can be coated with additional catalyst material prior to reinstalling the catalyst into the aftertreatment system. In particular implementations, a change in the packaging for the catalyst may be performed when reversing the catalyst material. The remanufactured component, via swapping of the inlet and outlet sides and regenerating the component, can have adequate performance for remanufactured components to meet remanufacture warranty life and/or may be sold at reduced prices.

II. Overview of Aftertreatment System

Figure 1:
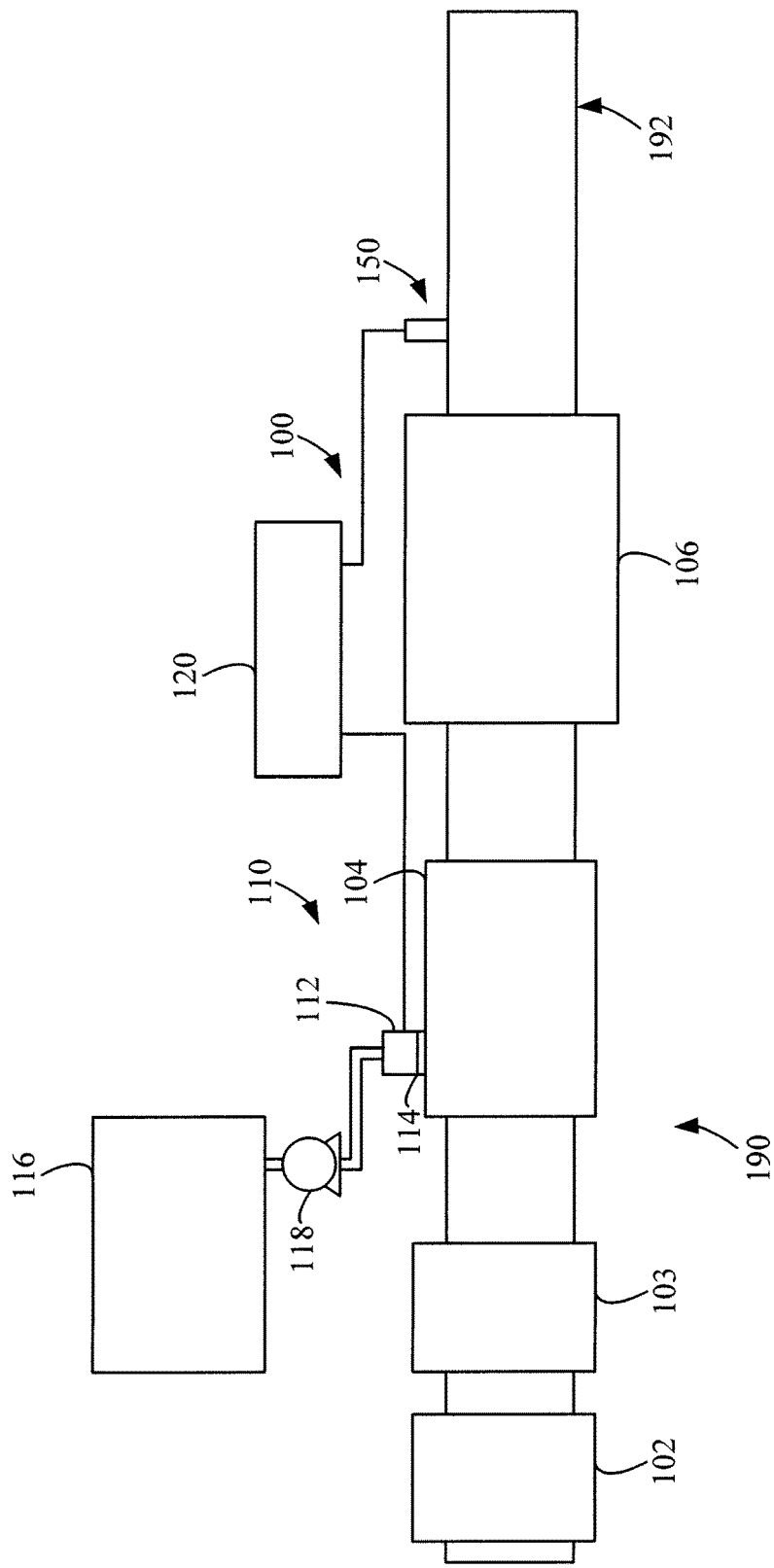
FIG. 1 is a block schematic diagram of an example selective catalytic reduction system having an example reductant delivery system for an exhaust system.

FIG. 1 depicts an aftertreatment system 100 having an example reductant delivery system 110 for an exhaust system 190. The aftertreatment system 100 includes a diesel oxidation catalyst (DOC) 102, a diesel particulate filter (DPF) 103, the reductant delivery system 110, a decomposition chamber or reactor 104, a SCR catalyst 106, and a sensor 150.

The DOC 102 is in fluid communication with a power plant (e.g., an engine) to oxidize hydrocarbons and carbon monoxide in the exhaust gas. The DOC 102 includes an inlet where the exhaust gas from the engine is received and an outlet where the exhaust gas exits after oxidizing the hydrocarbons and carbon monoxide from the exhaust gas. In some implementations, the DOC 102 may be configured to oxidize $NO_x$ in the exhaust gas as well while the exhaust is flowing through the DOC 102.

The DPF 103 is configured to remove particulate matter, such as soot, from exhaust gas flowing in the exhaust system 190. The DPF 103 includes an inlet, where the exhaust gas is received from the DOC 102, and an outlet, where the exhaust gas exits after having particulate matter substantially filtered from the exhaust gas and/or converting the particulate matter into carbon dioxide.

The decomposition chamber 104 is configured to convert a reductant, such as aqueous urea or diesel exhaust fluid (DEF), into ammonia. The decomposition chamber 104 includes a reductant delivery system 110 having a dosing module 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 103 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

In some implementations, the DPF 103 may be positioned downstream of the decomposition chamber or reactor pipe 104. For instance, the DPF 103 and the SCR catalyst 106 may be combined into a single unit, such as an SDPF. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DOC 102, within the DOC 102, between the DOC 102 and the DPF 103, within the DPF 103, between the DPF 103 and the decomposition chamber 104, within the decomposition chamber 104, between the decomposition chamber 104 and the SCR catalyst 106, within the SCR catalyst 106, and/or downstream of the SCR catalyst 106. In addition, two or more sensor 150 may be utilized for detecting a condition of the exhaust gas, such as two, three, four, five, or size sensor 150 with each sensor 150 located at one of the foregoing positions of the exhaust system 190

III. Example Process for Performance Recovery of a Component

Figure 2:
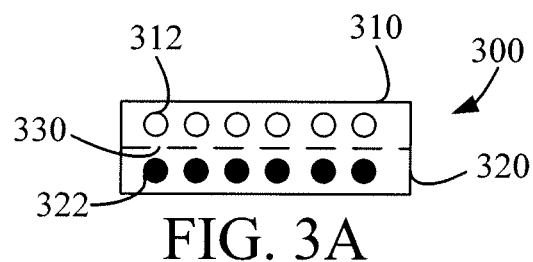
FIG. 2 is a block schematic diagram of an example layer configuration for a diesel oxidation catalyst.

FIG. 2 depicts an example portion 200 of a catalyst material for a catalyst, such as DOC 102 or SCR 106 of FIG. 1. The portion 200 may also be a catalyst material for an ammonia slip catalyst (also referred to as an ammonia oxidation catalyst (AMOX)), a $NO_x$ reduction catalyst, a $NO_x$ oxidation catalyst, a diesel particulate filter (DPF), a selective catalytic reduction-on-filter catalyst, or a three-way catalyst. The catalyst material 200 may include an upper layer 210 and a lower layer 220. The upper layer 210 may include one or more platinum group metals (PGMs), such as ruthenium, rhodium, palladium, osmium, iridium, platinum, etc, one or more rare earth metals, and/or one or more precious group metals. In an implementation for a DOC 102, the upper layer 210 may be formed of platinum only or primarily platinum for $NO_x$ oxidation and to provide sulfur tolerance (i.e., reducing or preventing sulfur from penetrating to the lower layer 220). The lower layer 220 may also include one or more PGMs, such as ruthenium, rhodium, palladium, osmium, iridium, platinum, etc. In an implementation for a DOC 102, the lower layer 220 may be a platinum and palladium bimetallic composition to provide thermal stability and perform HC oxidation.

In some implementations, the density of PGM in an upstream portion of the catalyst material may be higher than a density of PGM in a downstream portion. For instance, additional palladium may be added to the upstream portion to improve HC light-off performance. A lower density of PGM for the downstream portion may increase the amount of platinum relative to palladium to increase $NO_x$ oxidation performance.

In still further configurations, four portions for the catalyst material 200 may be defined, such as an upstream upper layer, an upstream lower layer, a downstream upper layer, and a downstream lower layer. The upstream upper and/or lower layers may include additional palladium to improve HC light-off performance while the downstream upper and/or lower layers include additional platinum to improve $NO_x$ oxidation performance. In some implementations, the upstream upper layer may have a composition to increase mass transfer through the upstream upper layer to the upstream lower layer to improve the HC light-off performance. In other implementations, the upper layer 210 and lower layer 220 may include one or more of a zeolite material (e.g., copper zeolite), a platinum/alumina material, $NO_x$ reduction materials, $NO_x$ oxidation materials, ammonia oxidation materials, diesel particulate filter materials, soot oxidation materials, etc.

Figure 3A:
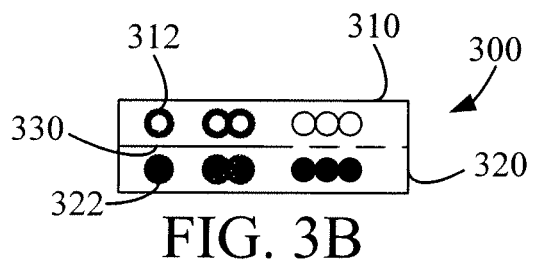
FIG. 3A is a schematic diagram of an example catalyst having an upper layer and lower layer of differing compositions of materials.

FIG. 3A depicts an example portion 300 of a catalyst material for a DOC catalyst having an upper layer 310 and a lower layer 320. In some implementations, the upper layer 310, the lower layer 320 and/or upstream and/or downstream portions thereof of the example portion 300 may have compositions such as those described in reference to FIG. 2. The upper layer 310 and lower layer 320 include representative catalyst material portions 312, 314, respectively. The upper layer 310 and lower layer 320 allow for exhaust gas to pass from the upper layer 310 to the lower layer 320, such as via the representative pores 330.

Figure 3B:
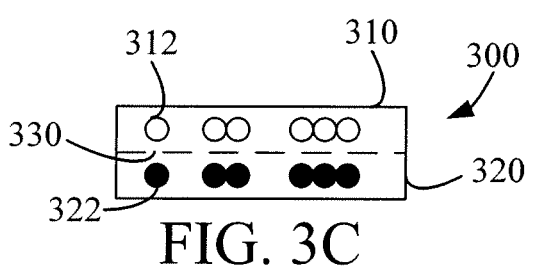
FIG. 3B is a schematic diagram of the catalyst of FIG. 3A depicting contamination on a front end of the catalyst and thermal sintering on a backend of the catalyst.

As the aftertreatment system is used to treat exhaust gas emissions, the performance of the catalyst material degrades in performance over time. Such degradation of performance may result from chemical contamination of the catalyst materials, such as the upstream representative catalyst material portions 312, 322, due to sulfur, phosphorous, or other contaminants in the exhaust gas emissions that coat the catalyst material, as shown in FIG. 3B. In addition, the upstream representative pores 330 formed between upper layer 310 and lower layer 310 of catalyst material may be blocked by contaminants as well, such as HC masking, $Al_2(SO_4)_3$ contaminations, etc. Moreover, the downstream representative catalyst material portions 312, 322 of the upper layer 310 and lower layer 320 of the catalyst material may thermally sinter together as shown by the representative catalyst material portions 312, 322 bunched together. Thus, as the catalyst material is exposed to exhaust gas emissions over a period of time, the chemical contamination of the upstream representative catalyst material portions 312, 322 may degrade in HC light-off performance due to the contaminants while the downstream representative catalyst material portions 312, 322 may degrade in $NO_x$ oxidation performance due to the thermal sintering of the catalyst material.

Figure 3C:
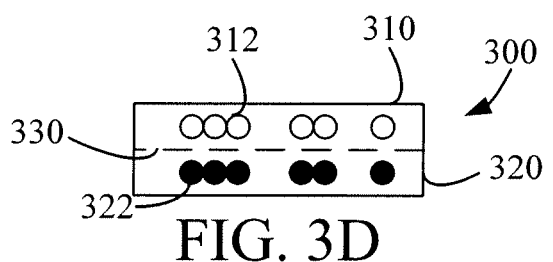
FIG. 3C is a schematic diagram of the catalyst of FIG. 3A depicting the catalyst after an acid wash and/or heat treatment regeneration process.

In some implementations, recovering HC light-off performance of a catalyst includes subjecting the catalyst material to an acid washing to remove the chemicals contaminating the catalyst material (e.g., a citric acid wash, an oxalic acid wash, etc.) and/or heat treating the catalyst. For example, acid washing is effective for removal of sulfur and/or phosphorous contaminants from the catalyst material while heat treating is effective for removing HC masking, $Al_2(SO_4)_3$ contaminations, etc. As a result of the acid washing and/or heat treating, contaminants on the upstream representative catalyst material portions 312, 322 may be removed and the blockage of the upstream representative pores 330 formed between upper layer 310 and lower layer 310 of catalyst material may be reduced and/or removed, as shown in FIG. 3C.

Figure 3D:
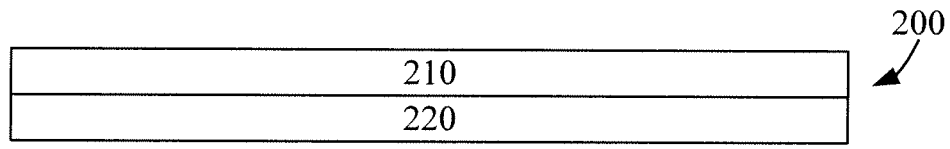
FIG. 3D is a schematic diagram of the catalyst of FIG. 3A depicting the catalyst having an outlet end and inlet end reversed relative to an exhaust flow path.

However, the downstream representative catalyst material portions 312, 322 of the catalyst material may still have degraded $NO_x$ oxidation performance due to the thermal sintering. Because HC light-off performance is less sensitive to thermal sintering of the catalyst material than the $NO_x$ oxidation performance, the downstream thermally sintered representative catalyst material portions 312, 322 can be repositioned upstream, as shown in FIG. 3D. Thus, the HC light-off performance is improved by the acid washing and/or heat treatment while the repositioning of the non-thermally sintered and/or lesser thermally sintered representative catalyst material portions 312, 322 downstream improves the $NO_x$ oxidation performance. The repositioning of the non-thermally sintered and/or lesser thermally sintered upstream representative catalyst material portions 312, 322 may be done via reversing the inlet and outlet of the catalyst relative to the exhaust gas flow (i.e., flipping the catalyst such that the original inlet is at the outlet side and the original outlet is at the inlet side). In some implementations, the original outlet face (which will be the new inlet face) can be coated with additional catalyst material prior to reinstalling the catalyst into the aftertreatment system. In some implementations, a change in the packaging for the catalyst may be done when reversing the catalyst material.

Figure 4:
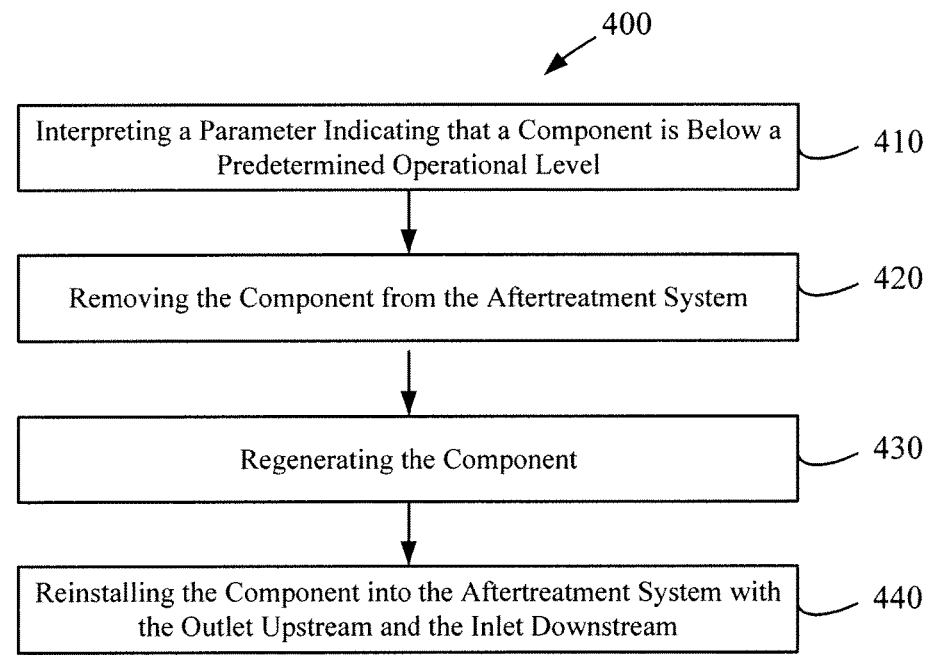
FIG. 4 is a process diagram for recovering component performance by reinstalling a component into an aftertreatment system with an outlet end upstream and an inlet end downstream.

FIG. 4 depicts an example process 400 for recovering component performance by reinstalling a component into an aftertreatment system with an outlet end upstream and an inlet end downstream. The process includes interpreting a parameter indicating that a component is below a predetermined operational level (block 410). The interpretation of the parameter indicating that a component is below a predetermined operational level may include interpreting a parameter indicative of a $NO_x$ concentration amount, an HC concentration amount, and/or another exhaust emission concentration amount downstream of the component, such as DOC 102 of FIG. 1. In other implementations, the interpretation of the parameter may be based on a feed-forward calculation of a condition of the component. In still further implementations, the interpretation of the parameter may be based on time parameter, such as an engine run time, a predetermined period of calendar time, etc. In some implementations, the interpretation of the parameter may be performed by a controller, such as controller 120 of FIG. 1. In other implementations, the interpretation of the parameter may be performed by a separate controller and/or computing device.

The predetermined operational level may be a percentage or value of hydrocarbon (HC) storage, a percentage or value of $NO_x$ storage, a percentage or value of ammonia storage, a percentage or value of oxygen storage, a percentage or value of HC oxidation, a percentage or value of NOx oxidation, a percentage or value of contamination, a percentage or value of thermal sintering, a predetermine filter capacity, etc. In some implementations, the predetermined operational level may be between 1%, inclusive, to 100%, inclusive, HC storage. In some implementations, the predetermined operational level may be 50% HC storage, 66% HC storage, or 75% HC storage. In other implementations, the predetermined operational level may be 55% HC storage, 60% HC storage, 65% HC storage, 70% HC storage, 80% HC storage, 85% HC storage, 90% HC storage, 95% HC storage, and/or 99% HC storage. In some implementations, the predetermined operational level may be between 1%, inclusive, to 100%, inclusive, $NO_x$ storage. In some implementations, the predetermined operational level may be 50% $NO_x$ storage, 66% $NO_x$ storage, or 75% $NO_x$ storage. In other implementations, the predetermined operational level may be 55% $NO_x$ storage, 60% $NO_x$ storage, 65% $NO_x$ storage, 70% $NO_x$ storage, 80% $NO_x$ storage, 85% $NO_x$ storage, 90% $NO_x$ storage, 95% $NO_x$ storage, and/or 99% $NO_x$ storage. In some implementations, the predetermined operational level may be between 1%, inclusive, to 100%, inclusive, ammonia storage. In some implementations, the predetermined operational level may be 50% ammonia storage, 66% ammonia storage, or 75% ammonia storage. In other implementations, the predetermined operational level may be 55% ammonia storage, 60% ammonia storage, 65% ammonia storage, 70% ammonia storage, 80% ammonia storage, 85% ammonia storage, 90% ammonia storage, 95% ammonia storage, and/or 99% ammonia storage. In some implementations, the predetermined operational level may be between 1%, inclusive, to 100%, inclusive, oxygen storage. In some implementations, the predetermined operational level may be 50% oxygen storage, 66% oxygen storage, or 75% oxygen storage. In other implementations, the predetermined operational level may be 55% oxygen storage, 60% oxygen storage, 65% oxygen storage, 70% oxygen storage, 80% oxygen storage, 85% oxygen storage, 90% oxygen storage, 95% oxygen storage, and/or 99% oxygen storage. In some implementations, the predetermined operational level may be between 1%, inclusive, to 100%, inclusive, HC oxidation. In some implementations, the predetermined operational level may be 50% HC oxidation, 66% HC oxidation, or 75% HC oxidation. In other implementations, the predetermined operational level may be 55% HC oxidation, 60% HC oxidation, 65% HC oxidation, 70% HC oxidation, 80% HC oxidation, 85% HC oxidation, 90% HC oxidation, 95% HC oxidation, and/or 99% HC oxidation. In some implementations, the predetermined operational level may be between 1%, inclusive, to 100%, inclusive, $NO_x$ oxidation. In some implementations, the predetermined operational level may be 50% $NO_x$ oxidation, 66% $NO_x$ oxidation, or 75% $NO_x$ oxidation. In other implementations, the predetermined operational level may be 55% $NO_x$ oxidation, 60% $NO_x$ oxidation, 65% $NO_x$ oxidation, 70% $NO_x$ oxidation, 80% $NO_x$ oxidation, 85% $NO_x$ oxidation, 90% $NO_x$ oxidation, 95% $NO_x$ oxidation, and/or 99% $NO_x$ oxidation. In some implementations, the predetermined operational level may be between 1%, inclusive, to 100%, inclusive, contamination. In some implementations, the predetermined operational level may be 50% contamination, 66% contamination, or 75% contamination. In other implementations, the predetermined operational level may be 50% contamination, 55% contamination, 60% contamination, 65% contamination, 70% contamination, 80% contamination, 85% contamination, 90% contamination, 95% contamination, and/or 99% contamination. In some implementations, the predetermined operational level may be between 1%, inclusive, to 100%, inclusive, thermal sintering. In some implementations, the predetermined operational level may be 50% thermal sintering, 66% thermal sintering, or 75% thermal sintering. In other implementations, the predetermined operational level may be 50% thermal sintering, 55% thermal sintering, 60% thermal sintering, 65% thermal sintering, 70% thermal sintering, 80% thermal sintering, 85% thermal sintering, 90% thermal sintering, 95% thermal sintering, and/or 99% thermal sintering. In some implementations, the predetermined operational level may be between 1%, inclusive, to 100%, inclusive, filter capacity. In some implementations, the predetermined operational level may be 50% filter capacity, 66% filter capacity, or 75% filter capacity. In other implementations, the predetermined operational level may be 50% filter capacity, 55% filter capacity, 60% filter capacity, 65% filter capacity, 70% filter capacity, 80% filter capacity, 85% filter capacity, 90% filter capacity, 95% filter capacity, and/or 99% filter capacity.

The process 400 further includes removing the component from the aftertreatment system (block 420). Removing the component from the aftertreatment system may include removing the component from within a casing, such as an outer shell and/or mat surrounding an outer portion of the component.

The process 400 includes regenerating the component (block 430). Regeneration of the component may include subjecting the component to an acid wash, heat treating the component, applying additional catalyst material (e.g., slurry) to a portion of the component, applying a coat of slurry to a front and/or rear face of the component, removing ash from the component, etc.

The process 400 further includes reinstalling the component into the aftertreatment system with the outlet positioned upstream and the inlet positioned downstream (block 440). Reinstalling the component may include replacing a mat that surrounds the component and/or reinserting the component into an outer shell. The mat and/or outer shell may, in some implementations, be a new mat and/or outer shell. In some further implementations, reinstalling the component may include compressing the outer shell and/or mat against an outer surface of the component and/or modifying the outer shell to form the casing. When the component is reinstalled into the aftertreatment system, the original inlet may be positioned downstream (e.g., at the original outlet connecting end of the aftertreatment system) and the original outlet may be positioned upstream (e.g., at the original inlet connecting end of the aftertreatment system). Thus, by swapping inlet and outlet for a catalyst component, HC light-off and NO oxidation performance may both be improved.

The process 400 may be applied to other catalysts, such as $NO_x$ reduction catalysts, $NO_x$ oxidation catalysts, ammonia oxidation catalysts, SCR catalysts, diesel particulate filters, soot oxidation catalysts, other particle oxidation catalysts, etc.

FIGS. 5 and 6 depict example HC light-off and $NO_x$ oxidation performance of DOC catalyst samples subjected to 650° C. thermal ageing for 10 hours. FIG. 5 depicts example HC light-off and $NO_x$ oxidation performance of DOC catalyst samples when subjected to heat treatment and/or acid washing without switching the inlet and outlet ends. FIG. 6 depicts example HC light-off and $NO_x$ oxidation performance of DOC catalyst samples when subjected to heat treatment and/or acid washing after switching the inlet and outlet ends. In some instances, the HC light-off activity may increase and/or a reduction in light-off temperature for the catalyst may occur after switching the inlet and the outlet ends.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation, and features from one combination can be combined with features in another combination in accordance with the understanding of one of ordinary skill in the art. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. When the language "at least a portion" and/or "a portion" is used the item can include a portion and/or the entire item unless specifically stated to the contrary.

What is claimed is:

1. A process for performance recovery for a component of an aftertreatment system, the component having an inlet and an outlet, the inlet positioned upstream relative to an exhaust gas flow from an engine through the aftertreatment system, the outlet positioned downstream relative to the exhaust gas flow through the aftertreatment system, the process comprising:

removing the component from the aftertreatment system, the removed component having a first portion that is on an inlet side of the component, and a second portion that is on an outlet side of the component, the second portion having degraded performance due to thermal sintering;

regenerating the component by at least one of (i) subjecting the component to an acid wash; or (ii) heat treating the component; and reinstalling the component into the aftertreatment system with the inlet positioned downstream relative to the exhaust gas flow through the aftertreatment system and the outlet positioned upstream relative to the exhaust gas flow through the aftertreatment system, such that the second portion of the component having degraded performance due to thermal sintering is upstream of the first portion of the component.

2. The process of claim 1, wherein removing the component from the aftertreatment system is performed responsive to interpreting a parameter indicating the component is below a predetermined operational level.

3. The process of claim 2, wherein the predetermined operational level is one of a percentage or value of hydrocarbon (HC) storage, a percentage or value of NOx storage, a percentage or value of ammonia storage, a percentage or value of oxygen storage, a percentage or value of hydrocarbon (HC) oxidation performance, a percentage or value of NOx oxidation performance, a percentage or value of contamination, a percentage or value of thermal sintering, or a predetermined filter capacity.

4. The process of claim 2, wherein the interpreted parameter is indicative of one of a NOx concentration amount, a hydrocarbon concentration amount, a feed-forward calculation of a condition of the component, an engine run time, or a predetermined period of calendar time.

5. The process of claim 1, wherein the component includes a catalyst material including one or more of a rare earth metal or precious group metal.

6. The process of claim 1, wherein the component includes a catalyst material including one or more of ruthenium, rhodium, palladium, osmium, iridium, or platinum.

7. The process of claim 1, wherein the component is a diesel oxidation catalyst.

8. The process of claim 1, wherein the component is one of a diesel particulate filter, a selective catalytic reduction catalyst, an ammonia slip catalyst, an SCR-on-filter, or a three-way catalyst.

9. A process for recovering performance for a component of an aftertreatment system, the component having an inlet and an outlet, the inlet positioned upstream relative to an exhaust gas flow from an engine through the aftertreatment system, the outlet positioned downstream relative to the exhaust gas flow through the aftertreatment system, the process comprising:

interpreting a parameter indicative of an operational level of the component via a controller;

comparing the parameter indicative of the operational level of the component to a predetermined operational level via the controller;

removing the component from the aftertreatment system responsive to the parameter indicative of the operational level of the component exceeding the predetermined operational level, the removed component having a first portion that is on an inlet side of the component, and a second portion that is on an outlet side of the component, the second portion having degraded performance due to thermal sintering;

regenerating the component by at least one of (i) subjecting the component to an acid wash, or (ii) heat treating the component; and reinstalling the component into the aftertreatment system with the inlet positioned downstream relative to the exhaust gas flow through the aftertreatment system and the outlet positioned upstream relative to the exhaust gas flow through the aftertreatment system, such that the second portion of the component having degraded performance due to thermal sintering is upstream of the first portion of the component.

10. The process of claim 9, wherein removing the component from the aftertreatment system includes removing the component from within a casing.

11. The process of claim 10, wherein the casing comprises an outer shell and a mat surrounding an outer portion of the component.

12. The process of claim 9, wherein the predetermined operational level is one of a percentage or value of hydrocarbon (HC) storage, a percentage or value of NOx storage, a percentage or value of ammonia storage, a percentage or value of oxygen storage, a percentage or value of HC oxidation performance, a percentage or value of NOx oxidation performance, a percentage or value of contamination, a percentage or value of thermal sintering, or a predetermined filter capacity.

13. The process of claim 9, wherein the interpreted parameter is indicative of one of a NOx concentration amount, a hydrocarbon concentration amount, a feed-forward calculation of a condition of the component, an engine run time, or a predetermined period of calendar time.

14. The process of claim 9, wherein the component comprises a catalyst material including one or more of a rare earth metal or precious group metal.

15. The process of claim 9, wherein the component comprises a catalyst material including one or more of ruthenium, rhodium, palladium, osmium, iridium, or platinum.

16. The process of claim 9, wherein the component is a diesel oxidation catalyst.

17. The process of claim 9, wherein the component is one of a diesel particulate filter, a selective catalytic reduction catalyst, an ammonia slip catalyst, an SCR-on-filter, or a three-way catalyst.

18. A process for recovering performance for a component of an aftertreatment system, the component having an inlet and an outlet, the inlet positioned upstream relative to an exhaust gas flow from an engine through the aftertreatment system, the outlet positioned downstream relative to the exhaust gas flow through the aftertreatment system, the process comprising:

interpreting a parameter indicative of an operational level of the component via a controller;

comparing the parameter indicative of the operational level of the component to a predetermined operational level via the controller;

removing the component from the aftertreatment system responsive to the parameter indicative of the operational level of the component exceeding the predetermined operational level, the removed component having a first portion that is on an inlet side of the component, and a second portion that is on an outlet side of the component, the second portion having degraded performance due to thermal sintering, wherein removing the component from the aftertreatment system includes removing the component from within an outer shell and a mat surrounding an outer portion of the component;

regenerating the component by at least one of (i) subjecting the component to an acid wash, or (ii) heat treating the component; and reinstalling the component into the aftertreatment system with the inlet positioned downstream relative to the exhaust gas flow through the aftertreatment system and the outlet positioned upstream relative to the exhaust gas flow through the aftertreatment system, such that the second portion of the component having degraded performance due to thermal sintering is upstream of the first portion of the component, wherein reinstalling the component into the aftertreatment system includes positioning a new mat around the outer portion of the component and encasing the component and new mat within the outer shell.

19. The process of claim 18, wherein the predetermined operational level is one of a percentage or value of hydrocarbon (HC) storage, a percentage or value of NOx storage, a percentage or value of ammonia storage, a percentage or value of oxygen storage, a percentage or value of HC oxidation performance, a percentage or value of NOx oxidation performance, a percentage or value of contamination, a percentage or value of thermal sintering, or a predetermined filter capacity.

* * * * *